Dec. 15, 1953   O. REICH   2,662,379
STORAGE DEVICE FOR LIQUEFIED GASES AND THE VAPORS THEREOF
Filed July 3, 1950
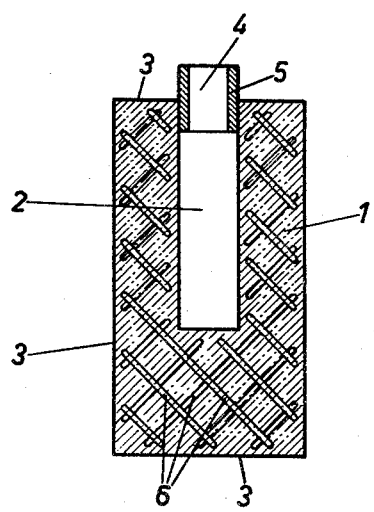
Inventor
O. Reich Patented Dec. 15, 1953

2,662,379

UNITED STATES PATENT OFFICE 2,662,379

STORAGE DEVICE FOR LIQUEFIED GASES AND THE VAPORS THEREOF

Otto Reich, Vienna, Austria, assignor of one-third to Julius Vignati, Vienna, Austria, and one-third to Erich Wieden, Solingen-Ohligs, Germany Application July 3, 1950, Serial No. 171,950

Claims priority, application Austria July 15, 1949

6 Claims. (Cl. 62—1)

Devices are known for the storage and conveyance of liquified gases and the vapours thereof, comprising a filling body of porous structure adapted to take up the gas or vapour, which body is arranged within a liquid- and gas-tight enclosure provided with an opening for filling and discharging. In these devices bottle-like pressure containers, known per se, of steel or other tenacious material serve as the enclosure for the material constituting the filling body, as for example active carbon, shredded peat or powdered natural silicates, mixed with sodium carbonate, precipitated alumina, or the like. The use of a porous filling body has the advantage that the pressure of the medium with which the porous structure is charged, even when there are considerable amounts thereof, cannot fully manifest itself beyond the region of the filling body, so that the liquid- and gas-tight enclosure containing the filling body is exposed to substantially less stress than would correspond to the actual pressure of the medium. It is supposed that the capillarity of the individual pores does not permit unhindered transmission of pressure to the space outside the porous storage material and in addition that the porous structure in consequence of its mechanical resistance to flow exerts a considerable throttling effect. The use has already also been proposed of a porous filling body enclosed in a corresponding tank-like container for storing the liquified or compressed fuel in gas-operated igniting apparatus.

The present invention is based on the discovery confirmed by numerous experiments, that with a suitable choice of the material of the filling body, for example pumice-stone, the provision of a separate liquid- and gas-tight enclosure surrounding the filling body is unnecessary, for a quite thin covering on the porous filling body, for example of lacquer, already suffices to seal the outwardly opening pores so tightly that a medium at say 10 atmospheres pressure can be stored quite pressure-tight in the filling body.

Accordingly, in conformity with the invention a fully pressure-tight device for storing and conveying liquified gases or the vapour thereof is obtained by forming the liquid- and gas-tight enclosure of the filling body by a coating, preferably a layer of lacquer, adhering to the surface of the filling body, which not only considerably reduces the weight and cost of the device, but also affords considerable advantages in the use thereof, in particular in gas-operated igniting apparatus, in which a filling body cartridge in accordance with the invention, charged with the liquified or compressed fuel is easily inserted in the casing of the apparatus, and after combustion, can be removed from the casing for recharging which can thus be effected entirely separately from the apparatus itself.

An example embodying the invention applied to the fuel container of gas-operated igniting apparatus is diagrammatically illustrated in the accompanying drawing.

In the figure, 1 indicates the filling body for storing and conveying the liquified fuel gas or the vapours formed from the liquified gas. This has a recess 2 which forms a vaporising chamber for the liquified gas, and is surrounded by a gas- and liquid-tight covering 3 in which is provided a filling and discharge opening 4 leading into the chamber 2. Into the opening 4 is fitted a tubular nozzle 5 which leads to the burner tube of the igniting apparatus.

The liquid- and gas-tight covering 3 surrounding the porous filling body is here formed by a coating adhering to the surface of the filling body, which can advantageously consist of a layer of lacquer. The lacquer applied to the surface of the filling body penetrates to a certain extent into the pores directly communicating with the surface, sealing these and at the same time anchoring the coating. Instead of a coating of lacquer, the burning or firing on of materials such as enamel, glaze or ceramic masses has also been found advantageous. A fully liquid- and gas-tight covering can also be produced in a simple manner by vulcanizing on a layer of rubber or by spraying on a coating of metal. In order to protect the porous filling body 1, advantageously made of pumice stone, from fracture or other damage to its structure, it can be reinforced with stiffening means 6 such as inlaid metal wires or the like.

The porous filling body 1 provided with the liquid- and gas-tight covering 3 is before use of the device, charged with the liquified gas which soaks into the individual pores and fills the minute hollow spaces formed thereby. The device or cartridge charged with liquified gas is then, after closing the filling and discharging opening 4, inserted in the igniting apparatus or attached to the burner section thereof, and connection of the vapourising chamber 2 made to the burner tube thereof. In consequence of the low cost of manufacture the storage device according to the invention can be replaced after consumption of its gas charge, by a charged one, and a charging operation does not need to be effected on the igniting apparatus itself, as was hitherto the case with the known gas-operated igniting apparatus with a fuel container in the form of a hollow metal body. The emptied device can be used afresh after each recharging.

I claim:

1. A device adapted for storing liquified gases and the vapors thereof comprising, in combination, a substantially rigid porous body and a coating anchored to and integral with said body at the surfaces thereof, said so-coated body having an opening for the charging and discharging of the liquified gases to be stored therein.

2. The device of claim 1 including reinforcing means for said substantially rigid body.

3. The device of claim 1 wherein said coating comprises a lacquer.

4. The device of claim 1 wherein said coating comprises a glazed ceramic material.

5. The device of claim 1 wherein said coating comprises vulcanized rubber.

6. The device of claim 1 wherein said coating comprises a sprayed metal.

OTTO REICH.

References Cited in the file of this patent

UNITED STATES PATENTS

| Number | Name | Date |
|---|---|---|
| 2,234,738 | Maude | Mar. 11, 1941 |
| 2,512,105 | Kooij | June 20, 1950 |
| 2,515,733 | Quercia | July 18, 1950 |